US011903065B2

(12) United States Patent
Sharma et al.

(10) Patent No.: US 11,903,065 B2
(45) Date of Patent: Feb. 13, 2024

(54) TELECOMMUNICATIONS APPARATUS AND METHODS (71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 416 days.

(21) Appl. No.: 17/413,573

(22) PCT Filed: Dec. 18, 2019

(86) PCT No.: PCT/EP2019/086007
§ 371 (c)(1),
(2) Date: Jun. 14, 2021

(87) PCT Pub. No.: WO2020/127522
PCT Pub. Date: Jun. 25, 2020

(65) Prior Publication Data
US 2022/0070952 A1 Mar. 3, 2022

(30) Foreign Application Priority Data

Dec. 20, 2018 (EP) .................................... 18214784

(51) Int. Cl.
*H04W 76/15* (2018.01)
*H04W 12/122* (2021.01)
(Continued)

(52) U.S. Cl.
CPC ......... *H04W 76/15* (2018.02); *H04W 12/122* (2021.01); *H04W 76/34* (2018.02); *H04W 88/06* (2013.01)

(58) Field of Classification Search
CPC ... H04W 76/15; H04W 12/122; H04W 76/34; H04W 88/06
See application file for complete search history.

(56) References Cited

U.S. PATENT DOCUMENTS 11,323,911 B2 * 5/2022 Dai ..................... H04W 76/12
11,432,356 B2 * 8/2022 Yang ..................... H04L 45/24
(Continued)

FOREIGN PATENT DOCUMENTS

WO  2015/066385 A2  5/2015
WO  2015/108389 A1  7/2015

OTHER PUBLICATIONS

International Search Report and Written Opinion dated Jun. 25, 2020, received for PCT Application PCT/EP2019/086007, Filed on Dec. 18, 2019, 14 pages.
(Continued)

*Primary Examiner* — Harry H Kim
(74) *Attorney, Agent, or Firm* — XSENSUS LLP (57) ABSTRACT A wireless telecommunication system comprising a terminal device, a first network access node and a second network access node, wherein the first and second network access nodes are configured to support a dual connectivity mode of operation for the terminal device in which the first network access node acts as a master network access node and the second network access node acts as a secondary network access node and in which the same data are communicated between the terminal device and the first network access node and between the terminal device and the second network access node.

13 Claims, 5 Drawing Sheets (51) Int. Cl.
*H04W 76/34* (2018.01)
*H04W 88/06* (2009.01)

(56) References Cited

U.S. PATENT DOCUMENTS

| | | | |
|---|---|---|---|
| 11,601,954 B2* | 3/2023 | Gao | H04W 80/02 |
| 2017/0230086 A1* | 8/2017 | Chen | H04L 1/1845 |
| 2018/0199315 A1 | 7/2018 | Hong et al. | |
| 2019/0253216 A1* | 8/2019 | Zhang | H04W 72/542 |
| 2020/0374955 A1* | 11/2020 | Dudda | H04W 76/15 |
| 2021/0014756 A1* | 1/2021 | Liu | H04W 36/0011 |

OTHER PUBLICATIONS

NTT Docomo, "New SID Proposal: Study on New Radio Access Technology", 3GPP TSG RAN Meeting #71, RP-160671, Mar. 7-10, 2016, 8 pages.

NTT Docomo Inc., "Revised WID on New Radio Access Technology", 3GPP TSG RAN Meeting #78, RP-172834, Dec. 18-21, 2017, 11 pages.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

Holma et al., "LTE for UMTS OFDMA and SC-FDMA Based Radio Access", John Wiley and Sons, 2009, pp. 25-27.

3GPP, "LTE; Evolved Universal Terrestrial Radio Access (E-UTRA) and Evolved Universal Terrestrial Radio Access Network (E-UTRAN); Overall description; Stage 2", 3GPP TS 36.300 version 13.2.0 Release 13, Jan. 2016, pp. 1-298.

3GPP, "Universal Mobile Telecommunications System (UMTS); LTE; 5G; NR; Multi-connectivity; Overall description; Stage-2", 3GPP TS 37.340 version 15.3.0 Release 15, Sep. 2018, pp. 1-58.

3GPP, "NR; Radio Resource Control (RRC) protocol specification (Release 15)", 3GPP TS 38.331 version 15.3.0, Sep. 2018, pp. 1-445.

3GPP, "Technical Specification Group Services and System Aspects; Security architecture and procedures for 5G system (Release 15)", 3GPP TS 33.501 version 15.2.0 Release 15, Sep. 2018, pp. 1-175.

ZTE Corporation, "Consideration on the counter check procedure in LTE/NR tight interworking", 3GPP TSG-RAN WG2 Meeting #99, R2-1708136, Aug. 21-25, 2017 5 pages.

ZTE Corporation, "Further Consideration on Counter Check procedure in MR-DC", 3GPP TSG RAN WG3#97, R3-172681, Aug. 21-25, 2017, 4 pages.

* cited by examiner

TELECOMMUNICATIONS APPARATUS AND METHODS

CROSS-REFERENCE TO RELATED APPLICATIONS

The present application is based on PCT filing PCT/EP2019/086007, filed Dec. 18, 2019, which claims priority to EP 18214784.3, filed Dec. 20, 2018, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to efficiently support communications with an ever-increasing range of devices and data traffic profiles than existing systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles and requirements.

One example use cases currently considered to be of interest for next generation wireless communication systems includes so-called Ultra Reliable and Low Latency Communications (URLLC). See, for example, the 3GPP documents RP-160671, "New SID Proposal: Study on New Radio Access Technology," NTT DOCOMO, RAN #71 [1]; RP-172834, "Work Item on New Radio (NR) Access Technology," NTT DOCOMO, RAN #78 [2]; and RP-182089, "New SID on Physical Layer Enhancements for NR Ultra-Reliable and Low Latency Communication (URLLC)," Huawei, HiSilicon, Nokia, Nokia Shanghai Bell, RAN #81 [3].

URLLC services are low latency and high reliability services, for example aiming to transmit data through the radio network with a target packet transit time (i.e. time from ingress of a layer 2 packet to its egress from the network) of 1 ms (i.e. so that each piece of URLLC data needs to be scheduled and transmitted across the physical layer in a time that is shorter than 1 ms). URLLC data transmissions are also expected to comprise relatively small amounts of data and to have a correspondingly short scheduling time, i.e. with control signalling and data transmitter with a frame duration that is less than that of eMBB (a typical eMBB frame duration may be expected to be 1 ms, which corresponds to a single slot for 3GPP 5G 15 kHz numerology). A further requirement for URLLC is high reliability with proposals for URLLC packets to be received with a 99.999% reliability within the 1 ms target packet transit time, and recent proposals for this to be increased to 99.9999% with a latency between 0.5 ms and 1 ms.

The inventors have recognized the desire to support transmissions with increased reliability, such as for URLLC data, in wireless telecommunications systems gives rise to new challenges that need to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
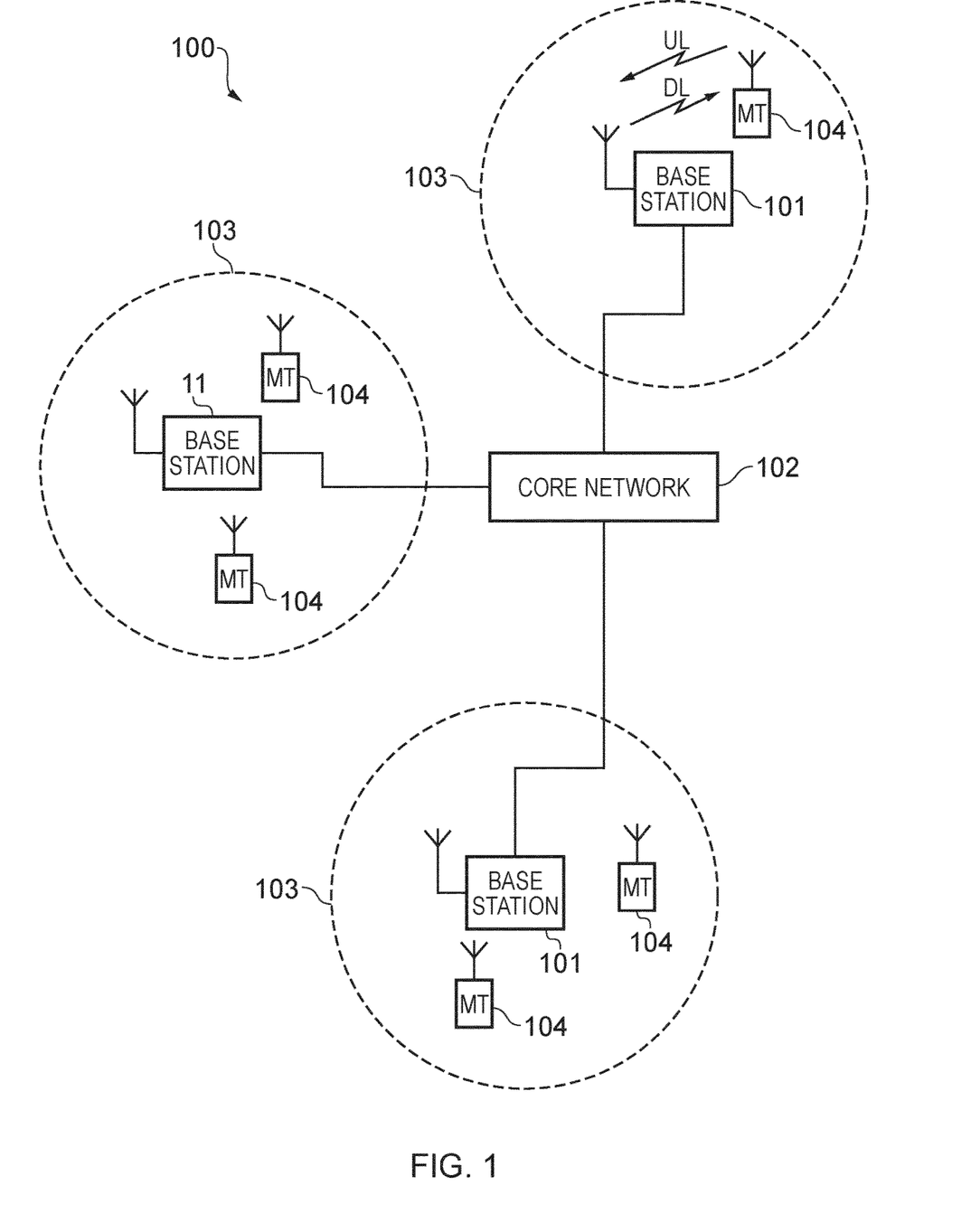
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body and associated proposals, and also described in many books on the subject, for example, Holma H. and Toskala A [4]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 within which data can be communicated to and from terminal devices 104. Data is transmitted from base stations 101 to terminal devices 104 within their respective coverage areas 103 via a radio downlink. The coverage area may be referred to as a cell. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
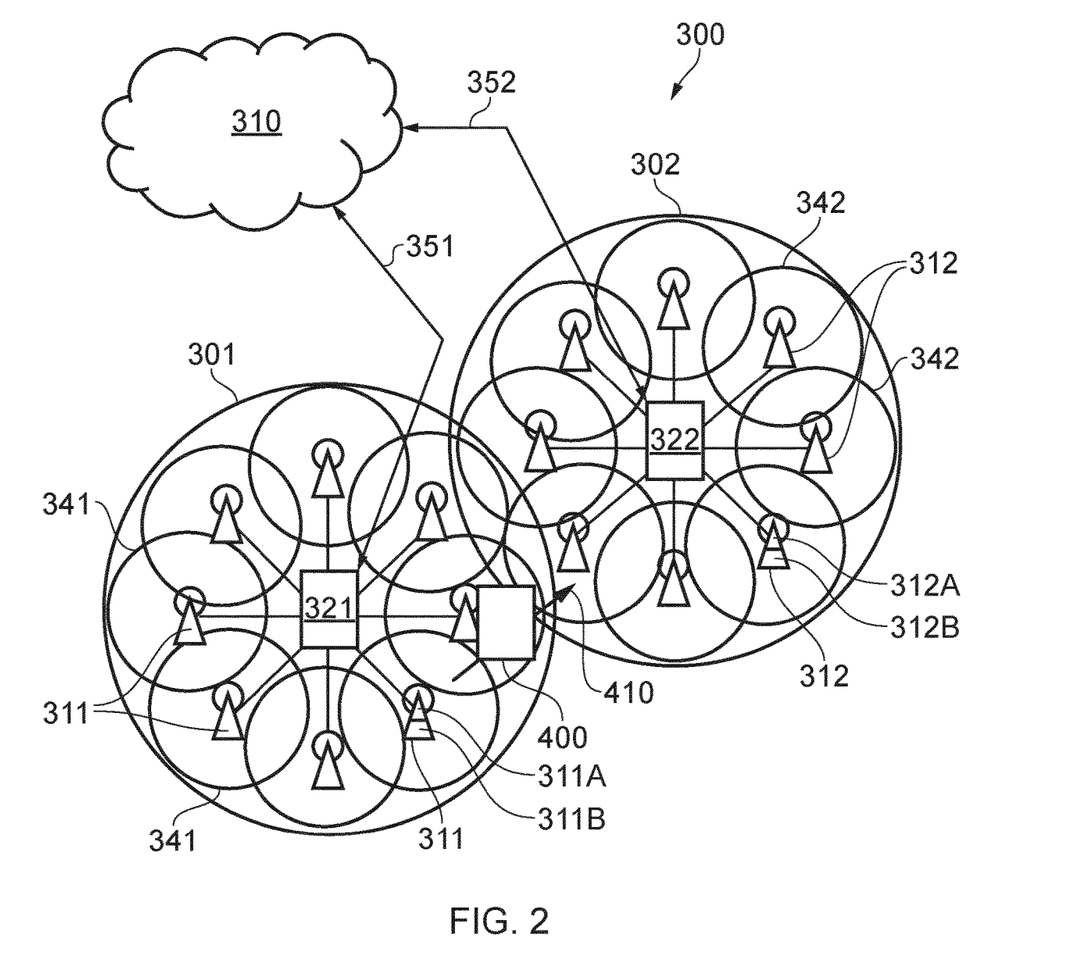
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311b, 312b configured to control the respective distributed units 311, 312.

In terms of broad top-level functionality, the core network component 310 of the telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2, and indeed in networks supporting aspects of different architectures in parallel, for example with co-existence of a legacy radio access network architecture, e.g., as schematically represented in FIG. 1, with a new RAT architecture, e.g., as schematically represented in FIG. 2. It will be appreciated the specific wireless telecommunications architecture in any given implementation is not of primary significance to the principles described herein. In this regard, certain embodiments of the disclosure may be described generally in the context of communications between network infrastructure equipment/access nodes and terminal devices, wherein the specific nature of the network infrastructure equipment/access nodes and terminal devices will depend on the specific network infrastructure for the implementation at hand. For example, in some scenarios the network infrastructure equipment/access nodes may comprise base stations, such as LTE-type base stations 101 as shown in FIG. 1, which are adapted to provide functionality in accordance with the principles described herein, and in other examples the network infrastructure equipment may comprise control units/controlling nodes 321, 322 and/or TRPs 311, 312 of the kind shown in FIG. 2 which are adapted to provide functionality in accordance with the principles described herein, and in yet other scenarios the network infrastructure equipment/access nodes may comprise both base stations, such as LTE-type base stations 101 as shown in FIG. 1 and control units/controlling nodes 321, 322 and/or TRPs 311, 312 of the kind shown in FIG. 2 with at least one being adapted to provide functionality in accordance with the principles described herein.

As discussed above, mobile communications networks such the network 100 shown in FIG. 1 and the network 300 shown in FIG. 2 may support services with different characteristics, including services for which reliability, i.e. ensuring a high chance data can be successfully transmitted through the network, is a primary consideration, e.g., for URLLC. Certain embodiments of the disclosure propose approaches that seek to help support the reliability of transmissions in a communications networks and may in particular be described in the context of URLLC data, but it will be appreciated that while the more stringent requirements associated with new types of data in wireless telecommunications systems may be seen as a driver for improving reliability, an improvement in reliability can be beneficial for any type of data for transmission in wireless telecommunications systems, whether classified as URLLC or similar data or otherwise.

It has previously been proposed for wireless telecommunications systems to support so-called dual connectivity which allows for a terminal device to be simultaneously connected to two radio access nodes/network infrastructure equipment. The concept of dual connectivity (DC) was introduced in Release 12 of the 3GPP standard governing the LTE architectures and it is expected corresponding functionality will also be provided in new RAT (NR) networks. In dual connectivity, network access nodes are specified as being either master network access nodes or secondary network access nodes, and user equipment can connect to the network through both master and secondary network access nodes at the same time. Dual connectivity has been previously proposed to enable sharing and combining of resources belonging to different network access nodes, and it has also been proposed to use dual connectivity to support make-before-break handover procedures, and more recently it has been suggested dual connectivity may be used to help introduce support redundancy, and the inventors have recognised how dual connectivity approaches can be developed to seek to further help improve reliability in a wireless telecommunications network.

Figure 3:
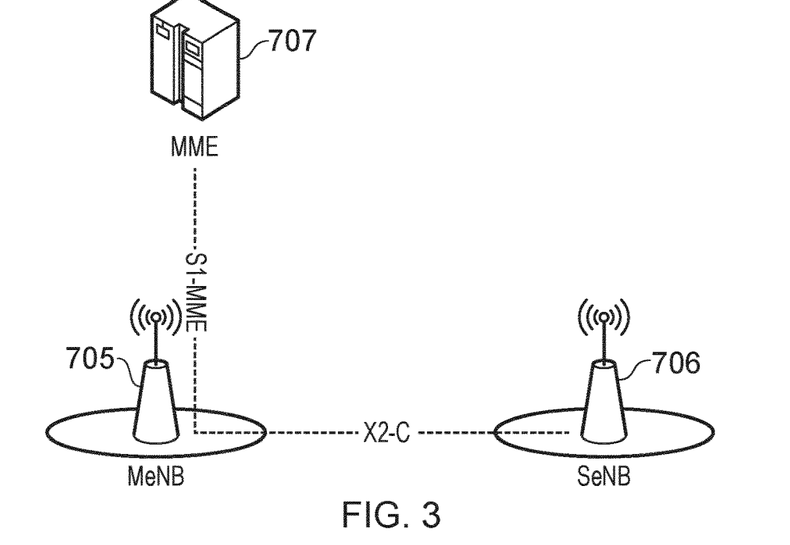
FIG. 3 shows a schematic representation of an example control plane architecture for dual connectivity in a wireless telecommunication network.

FIG. 3 shows a schematic representation of an example control plane architecture for conventional dual connectivity. A master network access node 705 (designated MeNB) and a secondary network access node 706 (designated SeNB) communicate via a control plane using X2-C layer protocol. In conventional dual connectivity only the MeNB 705 is designated for RRC handling. Consequently, the RRC entity resides in the MeNB 705, and communication with the core network in the form of a mobility management entity 707 (MME) via an S1-MME protocol layer terminates in the MeNB 705. It will be appreciated the use of terms such as "MeNB" and "SeNB" here, which are currently widely used in relation to current dual connectivity proposals, should not be interpreted as in any way restricting the approaches described herein to any specific generation of network architecture, but rather are used here purely for convenience of terminology, it being understood that the terms are used to refer to elements of a wireless telecommunications systems having corresponding functionality, regardless of the underlying network architecture. For example, the terms MeNB and SeNB may be used in relation to NR networks, in which corresponding terms such as MgNB and SgNB might also sometimes be used. More generally, for certain embodiments of the disclosure described herein the terms MN (master node) and SN (secondary node) may be used.

Figure 4A:
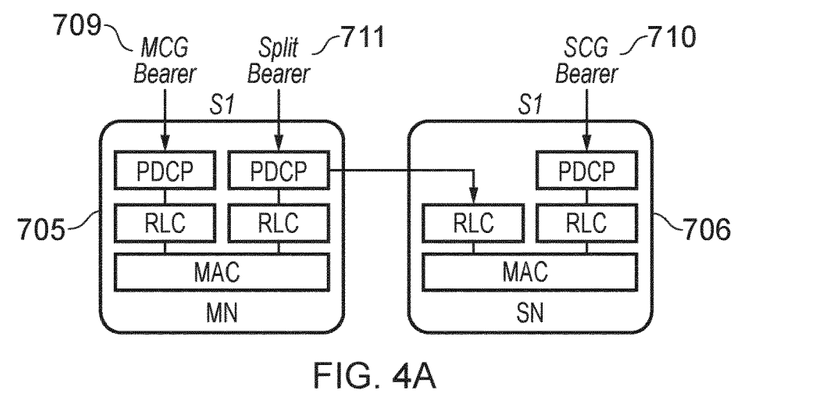
FIG. 4A shows a schematic representation of an example user plane protocol stack for a dual connectivity arrangement in a wireless telecommunication network.

FIG. 4A shows a schematic representation of an example user plane protocol stack for a dual connectivity arrangement. Typically, incoming data arrives via a bearer and is handled by the various protocol layers defined within the network architecture. Once master and secondary eNBs/ nodes are defined and grouped in dual connectivity, one can further designate a bearer intended for the MN 705 as a master cell group bearer, MCG bearer 709, and a bearer intended for the SN 706 as a secondary cell group bearer, SCG bearer 710. A bearer arrives via the S1 protocol layer, is handled by the eNB's resources in turn by a packet data convergence protocol (PDCP), then a radio link control (RLC) protocol, and then the medium access control (MAC) layer. As shown in FIG. 4A, each node 705, 706 has these resource layers to handle received bearers.

In addition to the MCG bearer and the SCG bearer, dual connectivity defines a third, split bearer, for the purpose of sharing resources in the MN and the SN on the network side of the telecommunications system. A split bearer 711 is delivered to a PDCP in the MN 705, and the MN 705, at the PDCP, then controls a split or division of the split bearer's data between the MN 705 and the SN 706. Data for the MN 705 is passed to the MN's RLC and then its MAC, and data for the SN 706 is passed from the MN 705, using the X2 protocol layer, to an RLC in the SN and then to the MAC of the SN.

Figure 4B:
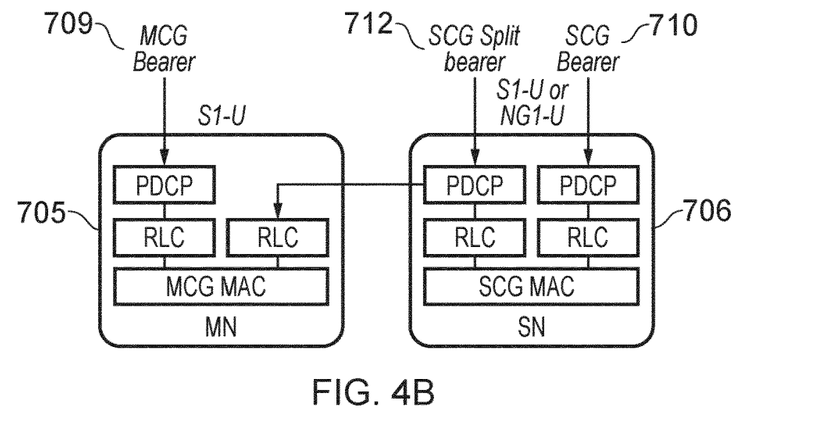
FIG. 4B shows a schematic representation of another example user plane protocol stack for a dual connectivity arrangement in a wireless telecommunication network.

FIG. 4B shows a schematic representation of an example user plane protocol stack utilising a SCG split bearer. As in FIG. 4A, a master node 705 and a secondary node 706 each receive their designated bearers, MCG bearer 709 and SCG bearer 710 respectively, and these are handled by a PCDP, a RLC and a MAC layer, as before. No split bearer of the type shown in FIG. 4A is included, however. Instead there is a SCG split bearer 712 which is delivered to the SN 706. A PDCP in the SN 706 receives the SCG split bearer 712 and divides the data. Some is retained in the SN, being passed to the RLC and MAC layers. Other data is passed from the SN 706 to the MN 705 via an X2 protocol, and the MN 705 handles it with its own RLC and MAC resources.

As mentioned above, only the MN has a RRC entity in a conventional DC implementation and so signalling radio bearers for RRC are transported over the MCG only, similar to an MCG bearer. For terminal devices configured for dual connectivity and split bearer transport, user traffic from the core network can be received at the MN as a split bearer, and then divided between the MN and the SN for handling and passing to the terminal device (user equipment/UE). Any traffic on a SCG bearer is received from the core network at the SN and transported using resources of the SN to the UE.

Further details regarding existing dual connectivity proposals can be found, for example, in 3GPP TS 36.300 version 13.2.0 Release 13 (2016-01) [5] (in particular Section 6.5).

Figure 5:
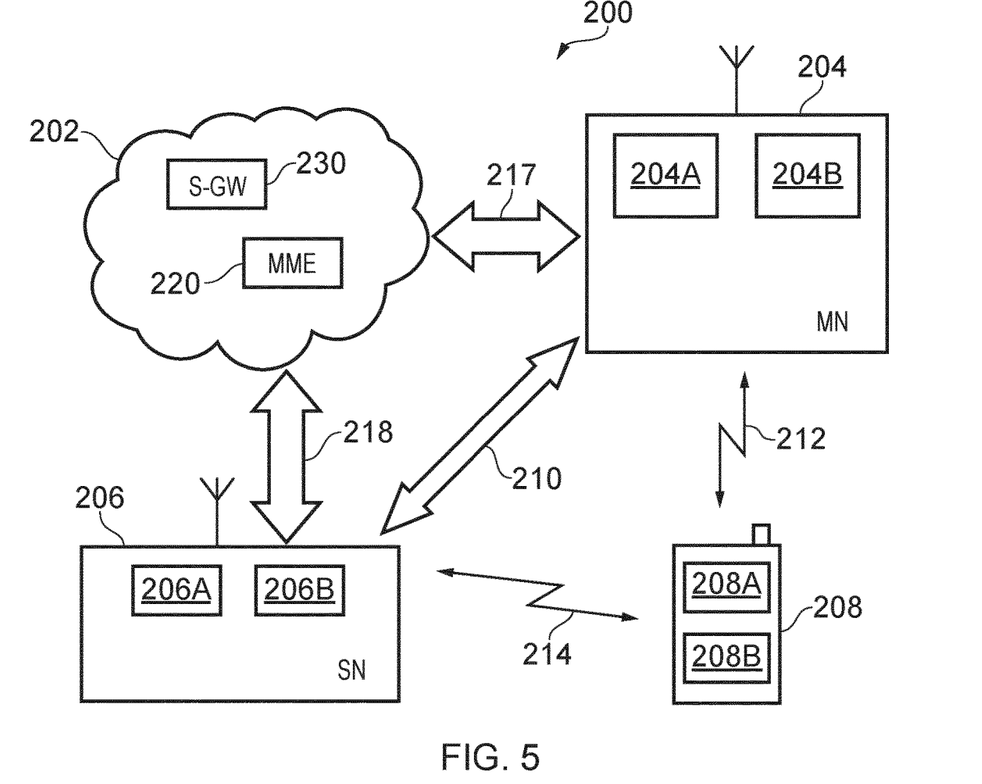
FIG. 5 schematically represents some aspects of a wireless telecommunication network in accordance with certain embodiments of the disclosure.

FIG. 5 schematically represents some aspects of a wireless telecommunications system 200 configured to operate to support dual connectivity for a terminal device 208 with a first, or master, network access node (MN) 204 and a second, or secondary, network access node (SN) 206 to seek to help increase reliability of data transmissions in the wireless telecommunications system 200 in accordance with certain embodiments of the disclosure. Aspects of the architecture and operation of the telecommunications system 200 which are not specifically described herein may be implemented in accordance with any previously proposed techniques, for example according to current 3GPP standards and other proposals for operating wireless telecommunications systems/networks. The network access nodes 204, 208 may, for convenience, sometimes be referred to herein as base stations 204, 208, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 200 comprises a core network part (evolved packet core) 202 coupled to a radio network part. The radio network part comprises the master network access node 204, the secondary network access node 206, and the terminal device 208. In this example, two network access nodes 204, 206 and one terminal device 208 are shown for simplicity, but it will of course be appreciated that in practice the radio network part may comprise a larger number of network access nodes serving a larger number of terminal devices across various communication cells.

In accordance with proposed dual connectivity approaches the terminal device 208 is simultaneously connected to, and able to communicate data with, both the master and secondary network access nodes (base stations/ transceiver stations) 204, 206. The network access nodes 204, 206 are communicatively connected via respective communication links 217, 218 to the core network part 202, and in particular to a serving gateway, S-GW, 230 in the core network part 202 arranged to perform routing and management of mobile communications services to the terminal devices in the telecommunications system 200 via the network access nodes 204, 206. In order to maintain mobility management and connectivity, the core network part 202 also includes a mobility management entity, MME, 220 which manages the enhanced packet service, EPS, connections with the terminal device 208 operating in the communications system based on subscriber information stored in a home subscriber server, HSS. Other network components in the core network in this example implementation (not shown for simplicity) include a policy charging and remaster function, PCRF, and a packet data network gateway, PDN- GW, which provides a connection from the core network part 202 to an external packet data network, for example the Internet. As noted above, the operation of the various elements of the communications system 200 shown in FIG. 5 may be broadly conventional apart from where modified to provide functionality in accordance with embodiments of the present disclosure as discussed herein.

The master network infrastructure element/access node 204 comprises transceiver circuitry 204a (which may also be referred to as a transceiver/transceiver unit) for transmission and reception of wireless signals and processor circuitry 204b (which may also be referred to as a processor/processor unit) configured to control the master network infrastructure element 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless telecommunications systems. The transceiver circuitry 204a and the processor circuitry 204b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the master network infrastructure element 204 will in general comprise various other elements associated with its operating functionality, such as a scheduler. For example, although not shown in FIG. 5 for simplicity, the processor circuitry 204b may comprise scheduling circuitry, that is to say the processor circuitry 204b may be configured/programmed to provide a scheduling function for the master network infrastructure element 204.

The secondary network infrastructure element/access node 206 is in general similar to the master network infrastructure element/access node 206 and also comprises transceiver circuitry 206a (transceiver/transceiver unit) for transmission and reception of wireless signals and processor circuitry 206b (processor/processor unit) configured to control the secondary network infrastructure element 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless telecommunications systems. The transceiver circuitry 206a and the processor circuitry 206b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). For example, although not shown in FIG. 5 for simplicity, the processor circuitry 206b may comprise scheduling circuitry, that is to say the processor circuitry 206b may be configured/programmed to provide the scheduling function for the secondary network infrastructure element 206.

The terminal device 208 is adapted to support operations in accordance with embodiments of the present disclosure when communicating with the network access nodes 204, 206. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 5 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 208 will in general comprise various other elements associated with its operating functionality, for example a power master, user interface, and so forth, but these are not shown in FIG. 5 in the interests of simplicity.

Figure 6:
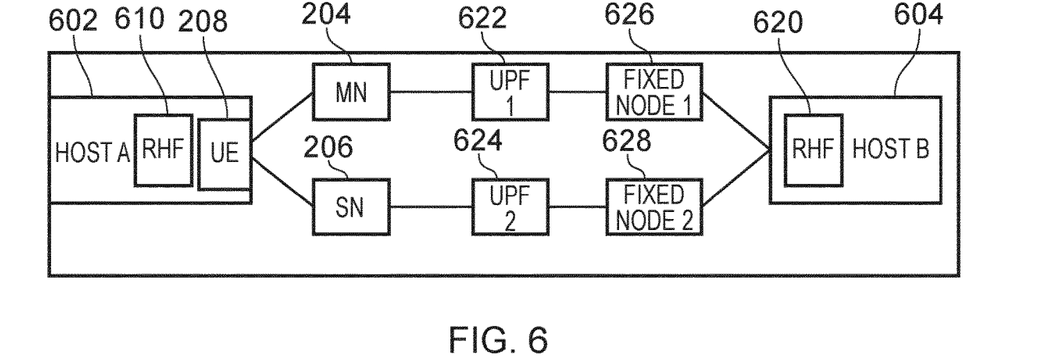
FIG. 6 schematically represents some aspects of a dual connective approach for providing redundancy in a wireless telecommunication network in accordance with certain embodiments of the disclosure.

As noted above, the inventors have recognised how dual connectivity approaches for introducing redundancy can be adapted to seek to help further improve reliability in wireless telecommunications systems. FIG. 6 schematically represents a scenario in which dual connectivity may be used to support enhanced reliability of data transfer from a first host node 602 (Host A) associated with the terminal device (UE) 208 to a second host node 604 (Host B), for example associated with an applications server for the data being communicated with the terminal device 208, in accordance with certain embodiments of the disclosure. Thus FIG. 6 schematically represents two separate paths for communicating data between the terminal device 208 and the host B 604 through the wireless telecommunications system 200 with one path being via the master node 204 and one path being via the secondary node 206, wherein the master node may be an LTE or NR master eNB/gNB and the secondary node may be a secondary eNB/gNB providing dual connectivity. The same data may be communicated over both paths to provide redundancy to seek to improve reliability, for example in the expectation communications may continue over one path in the event of radio interference disrupting communications over the other path.

Thus to provide for duplication/redundancy, the RHF (redundancy handling functions) 610, 620 in the respective host nodes 602, 604 establish two PDU sessions, one being an MCG bearer and another being an SCG bearer and which carrying the same data. The specific implementation of the RHF functions in the respective hosts is not significant and may depend on implementation. Thus the MCG bearer is associated with a first communications path via the master node 204, a first user plane function UPF1 622 and a first fixed node 626 while the SCG bearer is associated with a second communications path via the secondary node 206, a second user plane function UPF2 624 and a second fixed node 628.

Proposed dual connectivity approaches for EN-DC (evolved universal terrestrial radio access new radio dual connectivity) and MR-DC (multi-radio access technology dual connectivity) have been established on the assumption that the MCG or MeNB/MN cell is a macro cell and the SCG or SeNB/SN cell is a small cell within the Macro/MN cell. Since the macro/MN cell coverage is ubiquitous, all RRC (radio resource control) procedures including security, RLM/RLF (radio link monitoring/radio link failure) procedures, are centred in and controlled by the master node MN. In these configurations SRB 3 (signal radio bearer 3) is provided as a supplementary SRB. When SRB1 is split then RRC messages are still generated by the master node, but the user plane protocol stacks from both the MN and SN is used. So, SRB1 splitting can be used only for redundancy of user plane paths and not for the redundant RRC path.

In accordance with current proposals (see 3GPP TS 37.340 version 15.3.0 Release 15 (2018-09) [6] for more details), a decision to establish SRB3 is taken by the SN, which provides the SRB3 configuration using an SN RRC message. SRB3 establishment and release can be done at Secondary Node Addition and Secondary Node Change. SRB3 reconfiguration can be done at Secondary Node Modification procedure. SRB3 may be used to send SN RRC Reconfiguration, SN RRC Reconfiguration Complete and SN Measurement Report messages, only in procedures where the MN is not involved. SN RRC Reconfiguration Complete messages are mapped to the same SRB as the message initiating the procedure. SN Measurement Report messages are mapped to SRB3, if configured, regardless of whether the configuration is received directly from the SN or via the MN. No MN RRC messages are mapped to SRB3. SRB3 is modelled as one of the SRBs defined in 3GPP TS 38.331 version 15.3.0 Release 15 (2018-09) [7] and uses the NR-DCCH logical channel type. RRC PDUs on SRB3 are ciphered and integrity protected using NR PDCP, with security keys derived from S-KgNB. The SN selects ciphering and integrity protection algorithms for the SRB3 and provides them to the MN within the SCG Configuration for transmission to the UE. A NR SCG RRC message sent via E-UTRA MCG SRB is protected by E-UTRA MCG SRB security (NR security is not used in this case). SRB3 is of higher scheduling priority than all DRBs. The default scheduling priorities of split SRB1 and SRB3 are the same. There is no requirement on the UE to perform any reordering of RRC messages between SRB1 and SRB3. When SCG is released, SRB3 is released.

As a consequence of the current approaches for dual connectivity, if the communication path through the master node 204 in FIG. 6 fails, the communication path through the secondary node 206 cannot provide full redundancy in accordance with existing proposals for dual connectivity because the communication path through the secondary node 206 cannot properly support independent RRC signalling. However, when using the dual connectivity approach represented in FIG. 6 to provide redundancy, for example for URLLC data, SRB 3 or SRB over SN support is no longer only supplementary in nature, but needs to support some functions of SRB 1/2.

Thus in accordance with current approaches for dual connectivity, if the MN connection is lost, the terminal device declares RLF (radio link failure) and performs re-establishment. Even if the SN connection still has good radio conditions, it is currently removed if the MN connection fails. Even if the current approaches for dual connectivity are modified to maintain the SN connection on failed MN connection, the inventors have recognised that some issues still remain, for example in relation to counter check procedures.

The counter check procedure in wireless telecommunications systems is used to check if packets have been inserted in the middle by an intruder. Currently this procedure can only be initiated by the MN node. The procedure can also ask the terminal device to report SCG bearer terminated on SN side as well to the MCG or MN node. Thus, the SN may request the MN to execute a counter check procedure to verify the value of the PDCP COUNT(s) associated with DRB(s) offloaded to the SN. To accomplish this, the SN communicates this request and the expected values of PDCP COUNT(s) and associated radio bearer identities to the MN. The MN then issues a counter check request message to the terminal device on SRB1 which indicates the current COUNT MSB values associated to each DRB (data radio bearer) and requests the terminal device compares these with the terminal device's own COUNT MSB values and reports the result of the comparison in a counter check response message (also on SRB1). If the MN receives a RRC counter check response from the terminal device that indicates one or more PDCP COUNT values (possibly associated with both MN and SN) do not match expectation from the network side, the MN may release the connection (RRCRelease is not currently supported by the SN) or report the difference of the PDCP COUNT values to the serving AMF (Access and Mobility Management Function) or O&M (Operation and Maintenance) server for further traffic analysis, e.g., to seek to detect the intruder. Further details on existing counter check procedures can be found in the relevant standards, for example 3GPP TS 33.501 version 15.2.0 Release 15 (2018-09) [8].

In accordance with certain embodiments of the disclosure, if the MCG link (i.e. the link involving the master node (master network access node) 204 in FIG. 6) is down and it is determined a counter check procedure is required (for example in accordance with a predefined schedule or in response it being determined the MCG link is down), the secondary node may perform the counter check procedure. The counter check procedure by the secondary node may be performed using SRB3 or using a new SRB terminating in the secondary node. Thus, in certain embodiments of the disclosure, a counter check procedure may be performed over the secondary note side of a dual connectivity configuration when it is determined the master node side of the dual connectivity configuration has failed/has bad radio conditions.

Thus, certain embodiments of the disclosure provided a wireless telecommunication system comprising a terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, and wherein the second radio access node is configured to transmit a counter check request message to the terminal device to receive a counter check response message from the terminal device and to determine from the counter check response message if there is a mismatch in a count of packets transmitted to the terminal device on a data radio bearer and a count of packets received by the terminal device on the data radio bearer.

The data radio bearer in respect of which the packet counter check is made by the secondary node may be a data radio bearer which terminates in the secondary node or a data radio bearer which terminates in the master node. If the packet counter check is in respect of a data radio bearer which terminates in the master node, the secondary node may receive from the master node, e.g. in response to a request for the information, an indication of a count of packets transmitted by the master node to the terminal device on the relevant data radio bearer to allow the secondary node to establish if there is a mismatch. In some cases the system may be configured so that the secondary node is only allowed to transmit a packet counter check message to the terminal device and receive a packet counter check response message from the terminal device in respect of data radio bearers which terminates in the secondary node (i.e. the secondary node may be prevented from a undertaking a packet countercheck procedure in respect of a data radio bearer associated with the master node). This may be considered appropriate in some example implementations because it may be decided the security configuration for the secondary node is less secure than for the master node.

If the counter check procedure undertaken by the secondary node determines there is a mismatch in the count of packets transmitted by the network to the terminal device and the count of packets received by the terminal device, the secondary node may be configured to initiate transmission of an indication of this to a network entity providing a management function for the wireless telecommunication system to take further action. In some cases the secondary node may transmit the indication of the mismatch to the network entity directly, for example if the secondary node has a direct link to the relevant management function, for example an Operation and Maintenance function (O&M function) for the wireless telecommunications system. In some other cases the secondary node may transmit the indication of the detected mismatch to the network entity indirectly via the master note, for example if the secondary node does not have a direct link to the relevant management function, e.g. a serving Access and Mobility Management Function (AMF function). Thus the master node may be configured to transmit an indication that there is a mismatch in the count of packets to a network entity providing a management function for the wireless telecommunication system in response to receiving an indication the secondary node has determined there is a mismatch in the count of packets from the secondary node. In this regard it will be appreciated that a failure of the radio link between the terminal device and the master node does not necessarily mean the master node is unable to communicate with the secretary node all the relevant management function in the network over the relevant interfaces.

If the secondary node detects a mismatch in the packet count, the secondary node may be configured to transmit to the terminal device an indication that a radio resource connection with the terminal device is to be released. In addition, the secondary node may transmit a request to the master node for the radio resource connection to be released. In some implementations the radio resource control release message may be transmitted unprotected, regardless of the current security context for the terminal device. This can be beneficial because the terminal device may be configured to ignore any cell redirection or reselection instructions included in an unprotected RRC message which can help minimise the risk of a "spoofed" radio resource connection release message triggering the terminal device to connect to an illegitimate cell. In this regard it will be appreciated it may be advantageous for a radio access node to transmit an RRC release message in unprotected format regardless of its security context more generally, and even in the context of approaches that do not adopt the approaches described herein in relation to how a secondary node may support counter check procedure signalling exchange directly with a terminal device.

For example, some embodiments of the disclosure may provide a wireless telecommunication system (and a corresponding method of operating the wireless telecommunication system) comprising a terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, and wherein the second radio access node is configured to transmit to the terminal device an indication that a radio resource connection supporting the data radio bearer is to be released. In some examples the second radio access node is configured to transmit the indication that the radio resource connection supporting the data radio bearer is to be released in an unprotected type of message. In some examples the terminal device is configured to ignore any cell redirection or reselection instructions received in at least some types of message identified by the terminal device as being transmitted the second radio access node. That is to say, some embodiments of the disclosure may provide a terminal device (and corresponding circuitry and method of operating the terminal device) for use in a wireless telecommunication system comprising the terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the terminal device comprises controller circuitry and transceiver circuitry configured to operate together such that the terminal device is operable to ignore any cell redirection or reselection instructions received in at least some types of message (e.g. unprotected RRC messages) identified by the terminal device as being transmitted the second radio access node. Certain embodiments of the disclosure may also provide a second radio access node (and corresponding circuitry and method of operating the second radio access node) for use in a wireless telecommunication system comprising a terminal device, a first radio access node and the second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the second radio access node comprises controller circuitry and transceiver circuitry configured to operate together such that the second network access node is operable to transmit to the terminal device an indication that a radio resource connection supporting the data radio bearer is to be released.

Figure 7:
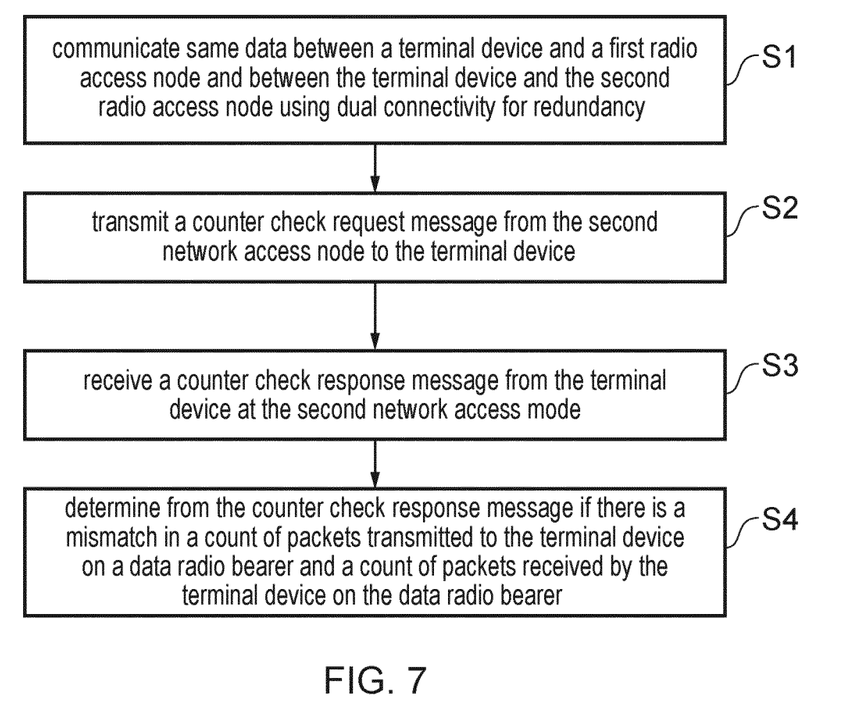
FIG. 7 is a flow diagram schematically representing some operating aspects of wireless telecommunications networks/systems in accordance with certain embodiments of the disclosure.

FIG. 7 is a flow diagram schematically representing some aspects of a method of operation in a wireless telecommunications system in accordance with certain embodiments of the disclosure.

In a first step, S1, the same data is communicated between a terminal device and a master node and secondary node supporting a dual connectivity mode of operation for the terminal device to provide redundancy.

In a second step, S2, the secondary node transmits a counter check request message to the terminal device. In general the formatting and signalling protocols associated with the counter check request message of step S2 may correspond with those used for conventional counter check request messages.

In a third step, S3, the terminal device responds to the counter check request message received from the secondary node in step S2 by sending a counter check response message. In general the formatting and signalling protocols associated with the counter check response message of step S3 may correspond with those used for conventional counter check response messages.

In a fourth step, S4, the secondary node determines from the counter check response message received in step S3 if there is a mismatch in a count of packets transmitted to the terminal device on a data radio bearer and a count of packets received by the terminal device on the data radio bearer.

It will be appreciated the approaches discussed herein, and summarised in the flow diagram of FIG. 7, may be adopted in respect of any kind of data transmitted in the wireless telecommunications system, or only in respect of certain types of data transmitted in the wireless telecommunications system, for example URLLC, or other close of data subjects to relatively stringent reliability requirements.

Thus, to summarise some aspects of approaches according to some embodiments of the disclosure if the MCG link is down there may be a need to perform a counter check procedure by the secondary node, in which case it may, for example, be performed either using SRB3 or a new SRB terminated in SN node. Thus in certain embodiments, a counter check procedure may be performed directly by the secondary node side of the SRB when the master node radio conditions are bad.

In some examples the SN may be permitted to perform counter check procedures only for the bearers terminated in the SN node itself—i.e. it may be prohibited from performing counter check procedure for DRBs terminated on MN side. This may be adopted in some implementations due to node security concerns if the secondary node is considered less secure than the master node, albeit sufficiently secure to perform a counter check procedure. This approach could be implemented, for example, by restricting which/how many DRB identities can be included in a counter check request message to DRBs that terminate in the secondary node.

If a counter check procedure finds an inconsistency (e.g. an indication packets are being inserted), then the actions defined may be to inform AMF or O&M and/or release the RRC connection, similar to the approach currently used for the master node. However, it may be that in some cases the SN does not have a connection to the relevant management function entity, e.g. the AMF. In this case the result of the counter check procedure may be reported over the Xn interface to the master node (assuming the MN equipment itself or the MN-AMF link did not fail) and then MN reports it to the AMF. However, in some cases the SN may have a connection to the relevant management function entity, e.g. the O&F function. In this case the result of the counter check procedure may be reported by the secondary node directly to the relevant management entity.

For the SN to be able to release the connection, RRCRelease message from SN are introduced.

When a UE receives an RRC Release message, there is no cause value defined in the RRCRelease message and so the UE has no idea about the reason for the RRC connection release. Within the 3GPP community it has been agreed that a new requirement should be that UEs do not act on redirectedCarrierinfo or cellReselectionPriority IEs if RRCRelease message includes them and was sent before security activation. This requirement can help reduce the risk of a fake radio network access node sending an unprotected RRCRelease and redirecting the UE to a malicious network ("spoofing"). This requirement would normally not be relevant to a secondary node in a dual connectivity scenario because the SN is setup/configured only after security activation, and so there is no reason why the SN should send a RRCRelease message unprotected. However, if the connection release is due to counter check failure then in some example implementations the SN may be configured to send the RRCRelease message unprotected. This can help ensure the UE does not apply any redirected carrier information or cell reselection information and so avoid any undesirable consequences due to a security issue. In some cases the SN may inform the MN over the Xn interface if the UE has been released so that MN (CU) can release the remaining connection with AMF and release stored UE context. Alternatively, the SN may request MN to release the connection and MN sends unprotected RRCRelease message.

Thus, in accordance with some example implementations, a network implementing the approaches described herein can seek to help ensure any eavesdropping or man-in-the-middle attacks are detected by initiating a counter check procedure either periodically or any time, even if the MN link has failed. If a counter check procedure is required when the MN link is not available and the UE is configured for path/equipment redundancy, then the SN can undertake the procedure. It may be the case the MN link is made intentionally unavailable to the UE by sabotage.

An aspect of some embodiments of the disclosure is that redundancy can be provided without complete RRC duplication, i.e. without there being two independent RRC entities in each of the terminal device and the network, but instead there can be two RRC entities in the network, but only a single RRC entity in the terminal device. Thus in some cases the countercheck procedure implemented by a secondary node as described herein may be configured to operate only when there is a failure in the primary/master node communications link so that despite there being two RRC entities on the network side, there will be only one active RRC procedure for the terminal device.

Thus there has been described a wireless telecommunication system comprising a terminal device, a first network access node and a second network access node, wherein the first and second network access nodes are configured to support a dual connectivity mode of operation for the terminal device in which the first network access node acts as a master network access node and the second network access node acts as a secondary network access node and in which the same data are communicated between the terminal device and the first network access node and between the terminal device and the second network access node, and wherein the second network access node is configured to transmit a counter check request message to the terminal device to receive a counter check response message from the terminal device and to determine from the counter check response message if there is a mismatch in a count of packets transmitted to the terminal device on a data radio bearer associated with the first network access node or second network access node and a count of packets received by the terminal device on the data radio bearer.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not significance to the principles of operation described herein.

Respective features of the present disclosure are defined by the following numbered paragraphs:

Paragraph 1. A wireless telecommunication system comprising a terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, and wherein the second radio access node is configured to transmit a counter check request message to the terminal device to receive a counter check response message from the terminal device and to determine from the counter check response message if there is a mismatch in a count of packets transmitted to the terminal device on a data radio bearer and a count of packets received by the terminal device on the data radio bearer.

Paragraph 2. The wireless telecommunication system of paragraph 1, wherein the data radio bearer is terminated in the second radio access node.

Paragraph 3. The wireless telecommunication system of paragraph 1, wherein the data radio bearer is terminated in the first radio access node, and wherein the second radio access node is configured to receive from the first radio access node an indication of a count of packets transmitted to the terminal device on the data radio bearer by the first radio access node.

Paragraph 4. The wireless telecommunication system of paragraph 1, wherein the second radio access node is configured so that it is not able to transmit a counter check request message to the terminal device in respect of a data radio bearer that terminates in the first radio access node.

Paragraph 5. The wireless telecommunication system of any of paragraphs 1 to 4, wherein the second radio access node is configured to transmit an indication there is a mismatch in the count of packets to a network entity providing a management function for the wireless telecommunication system in response to determining there is a mismatch in the count of packets for the data radio bearer.

Paragraph 6. The wireless telecommunication system of any of paragraphs 1 to 5, wherein the second radio access node is configured to transmit an indication there is a mismatch in the count of packets to the first radio access node in response to determining there is a mismatch in the count of packets for the data radio bearer.

Paragraph 7. The wireless telecommunication system of paragraph 6, wherein the first radio access node is configured to transmit an indication there is a mismatch in the count of packets to a network entity providing a management function for the wireless telecommunication system in response to receiving an indication the second radio access node has determined there is a mismatch in the count of packets from the second radio access node.

Paragraph 8. The wireless telecommunication system of any of paragraphs 1 to 7, wherein the second radio access node is configured to transmit to the terminal device an indication that a radio resource connection supporting the data radio bearer is to be released in response to determining there is a mismatch in the count of packets for the data radio bearer.

Paragraph 9. The wireless telecommunication system of paragraph 8, wherein the second radio access node is configured to transmit the indication that the radio resource connection supporting the data radio bearer is to be released in an unprotected type of message.

Paragraph 10. The wireless telecommunication system of any of paragraphs 1 or 9, wherein the terminal device is configured to ignore any cell redirection or reselection instructions received in at least some types of message identified by the terminal device as being transmitted the second radio access node.

Paragraph 11. The wireless telecommunication system of any of paragraphs 1 to 7, wherein the second radio access node is configured to transmit to the first radio access node a request for the first radio access node to transmit to the terminal device an indication that a radio resource connection supporting the data radio bearer is to be released in response to determining there is a mismatch in the count of packets for the data radio bearer.

Paragraph 12. A method of operation for a wireless telecommunication system comprising a terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the method comprises the second radio access node transmitting a counter check request message to the terminal device and receiving a counter check response message from the terminal device and determining from the counter check response message if there is a mismatch in a count of packets transmitted to the terminal device on a data radio bearer and a count of packets received by the terminal device on the data radio bearer.

Paragraph 13. A second radio access node for use in a wireless telecommunication system comprising a terminal device, a first radio access node and the second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the second radio access node comprises controller circuitry and transceiver circuitry configured to operate together such that the second network access node is operable to transmit a counter check request message to the terminal device and to receive a counter check response message from the terminal device and to determine from the counter check response message if there is a mismatch in a count of packets transmitted to the terminal device on a data radio bearer and a count of packets received by the terminal device on the data radio bearer.

Paragraph 14. Circuitry for a second radio access node for use in a wireless telecommunication system comprising a terminal device, a first radio access node and the second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the circuitry comprises controller circuitry and transceiver circuitry configured to operate together such that the circuitry is operable to cause the second radio access node to transmit a counter check request message to the terminal device and to receive a counter check response message from the terminal device and to determine from the counter check response message if there is a mismatch in a count of packets transmitted to the terminal device on a data radio bearer and a count of packets received by the terminal device on the data radio bearer.

Paragraph 15. A method of operation for a second radio access node in a wireless telecommunication system comprising a terminal device, a first radio access node and the second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the method comprises the second radio access node transmitting a counter check request message to the terminal device and receiving a counter check response message from the terminal device and determining from the counter check response message if there is a mismatch in a count of packets transmitted to the terminal device on a data radio bearer and a count of packets received by the terminal device on the data radio bearer.

Paragraph 16. A terminal device for use in a wireless telecommunication system comprising the terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the terminal device comprises controller circuitry and transceiver circuitry configured to operate together such that the terminal device is operable to receive a counter check request message from the second radio access node and to transmit a counter check response message to the second network access node in response to the counter check request, wherein the counter check response message provides the second network access node with an indication of whether there is a mismatch in a count of packets transmitted to the terminal device on a data radio bearer and a count of packets received by the terminal device on the data radio bearer.

Paragraph 17. Circuitry for a terminal device for use in a wireless telecommunication system comprising the terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the circuitry comprises controller circuitry and transceiver circuitry configured to operate together such that the circuitry is operable to cause the terminal device to receive a counter check request message from the second radio access node and to transmit a counter check response message to the second network access node in response to the counter check request, wherein the counter check response message provides the second network access node with an indication of whether there is a mismatch in a count of packets transmitted to the terminal device on a data radio bearer and a count of packets received by the terminal device on the data radio bearer.

Paragraph 18. A method of operation for terminal device in a wireless telecommunication system comprising the terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the method comprises the terminal device receiving a counter check request message from the second radio access node and transmitting a counter check response message to the second network access node in response to receiving the counter check request, wherein the counter check response message provides the second network access node with an indication of whether there is a mismatch in a count of packets transmitted to the terminal device on a data radio bearer and a count of packets received by the terminal device on the data radio bearer.

Paragraph 19. A wireless telecommunication system comprising a terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, and wherein the second radio access node is configured to transmit to the terminal device an indication that a radio resource connection supporting the data radio bearer is to be released.

Paragraph 20. A terminal device for use in a wireless telecommunication system comprising the terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the terminal device comprises controller circuitry and transceiver circuitry configured to operate together such that the terminal device is operable to ignore any cell redirection or reselection instructions received in at least some types of message identified by the terminal device as being transmitted the second radio access node.

Paragraph 21. A second radio access node for use in a wireless telecommunication system comprising a terminal device, a first radio access node and the second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the second radio access node comprises controller circuitry and transceiver circuitry configured to operate together such that the second network access node is operable to transmit to the terminal device an indication that a radio resource connection supporting the data radio bearer is to be released.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10 Mar. 2016

[2] 3GPP document RP-172834, "Work Item on New Radio (NR) Access Technology," NTT DOCOMO, RAN #78, Lisbon, Portugal, 18 to 21 Dec. 2017

[3] 3GPP document RP-182089, "New SID on Physical Layer Enhancements for NR Ultra-Reliable and Low Latency Communication (URLLC)," Huawei, HiSilicon, Nokia, Nokia Shanghai Bell, RAN #81, Gold Coast, Australia, 10 to 13 Sep. 2018

[4] Holma H. and Toskala A, "LTE for UMTS OFDMA and SC-FDMA based radio access", John Wiley and Sons, 2009

[5] 3GPP TS 36.300 version 13.2.0 Release 13 (2016-01)

[6] 3GPP TS 37.340 version 15.3.0 Release 15 (2018-09)

[7] 3GPP TS 38.331 version 15.3.0 Release 15 (2018-09)

[8] 3GPP TS 33.501 version 15.2.0 Release 15 (2018-09)

What is claimed is:

1. A wireless telecommunication system comprising a terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, and wherein the second radio access node is configured to transmit a counter check request message to the terminal device to receive a counter check response message from the terminal device and to determine from the counter check response message if there is a mismatch in a count of packets transmitted to the terminal device on a data radio bearer and a count of packets received by the terminal device on the data radio bearer.

2. The wireless telecommunication system of claim 1, wherein the data radio bearer is terminated in the second radio access node.

3. The wireless telecommunication system of claim 1, wherein the data radio bearer is terminated in the first radio access node, and wherein the second radio access node is configured to receive from the first radio access node an indication of a count of packets transmitted to the terminal device on the data radio bearer by the first radio access node.

4. The wireless telecommunication system of claim 1, wherein the second radio access node is configured so that it is not able to transmit a counter check request message to the terminal device in respect of a data radio bearer that terminates in the first radio access node.

5. The wireless telecommunication system of claim 1, wherein the second radio access node is configured to transmit an indication there is a mismatch in the count of packets to a network entity providing a management function for the wireless telecommunication system in response to determining there is a mismatch in the count of packets for the data radio bearer.

6. The wireless telecommunication system of claim 1, wherein the second radio access node is configured to transmit an indication there is a mismatch in the count of packets to the first radio access node in response to determining there is a mismatch in the count of packets for the data radio bearer.

7. The wireless telecommunication system of claim 6, wherein the first radio access node is configured to transmit an indication there is a mismatch in the count of packets to a network entity providing a management function for the wireless telecommunication system in response to receiving an indication the second radio access node has determined there is a mismatch in the count of packets from the second radio access node.

8. The wireless telecommunication system of claim 1, wherein the second radio access node is configured to transmit to the terminal device an indication that a radio resource connection supporting the data radio bearer is to be released in response to determining there is a mismatch in the count of packets for the data radio bearer.

9. The wireless telecommunication system of claim 8, wherein the second radio access node is configured to transmit the indication that the radio resource connection supporting the data radio bearer is to be released in an unprotected type of message.

10. The wireless telecommunication system of claim 1, wherein the terminal device is configured to ignore any cell redirection or reselection instructions received in at least some types of message identified by the terminal device as being transmitted the second radio access node.

11. The wireless telecommunication system of claim 1, wherein the second radio access node is configured to transmit to the first radio access node a request for the first radio access node to transmit to the terminal device an indication that a radio resource connection supporting the data radio bearer is to be released in response to determining there is a mismatch in the count of packets for the data radio bearer.

12. A method of operation for a second radio access node in a wireless telecommunication system comprising a terminal device, a first radio access node and the second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the method comprises the second radio access node transmitting a counter check request message to the terminal device and receiving a counter check response message from the terminal device and determining from the counter check response message if there is a mismatch in a count of packets transmitted to the terminal device on a data radio bearer and a count of packets received by the terminal device on the data radio bearer.

13. A method of operation for terminal device in a wireless telecommunication system comprising the terminal device, a first radio access node and a second radio access node, wherein the first and second radio access nodes are configured to support a dual connectivity mode of operation for the terminal device in which the first radio access node acts as a master radio access node and the second radio access node acts as a secondary radio access node and in which the same data are communicated between the terminal device and the first radio access node and between the terminal device and the second radio access node, wherein the method comprises the terminal device receiving a counter check request message from the second radio access node and transmitting a counter check response message to the second network access node in response to receiving the counter check request, wherein the counter check response message provides the second network access node with an indication of whether there is a mismatch in a count of packets transmitted to the terminal device on a data radio bearer and a count of packets received by the terminal device on the data radio bearer.

\* \* \* \* \*